Patented Feb. 9, 1943

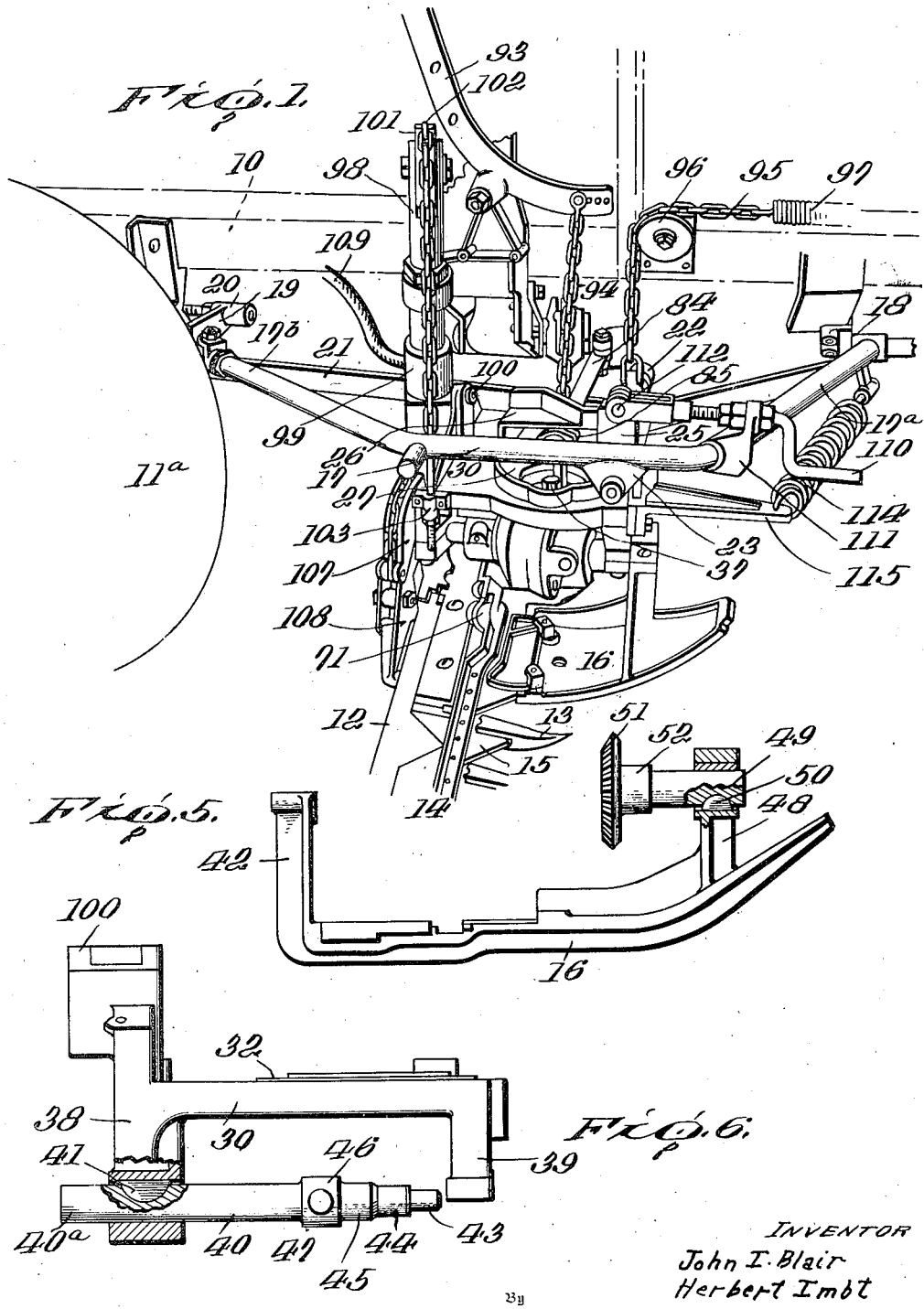

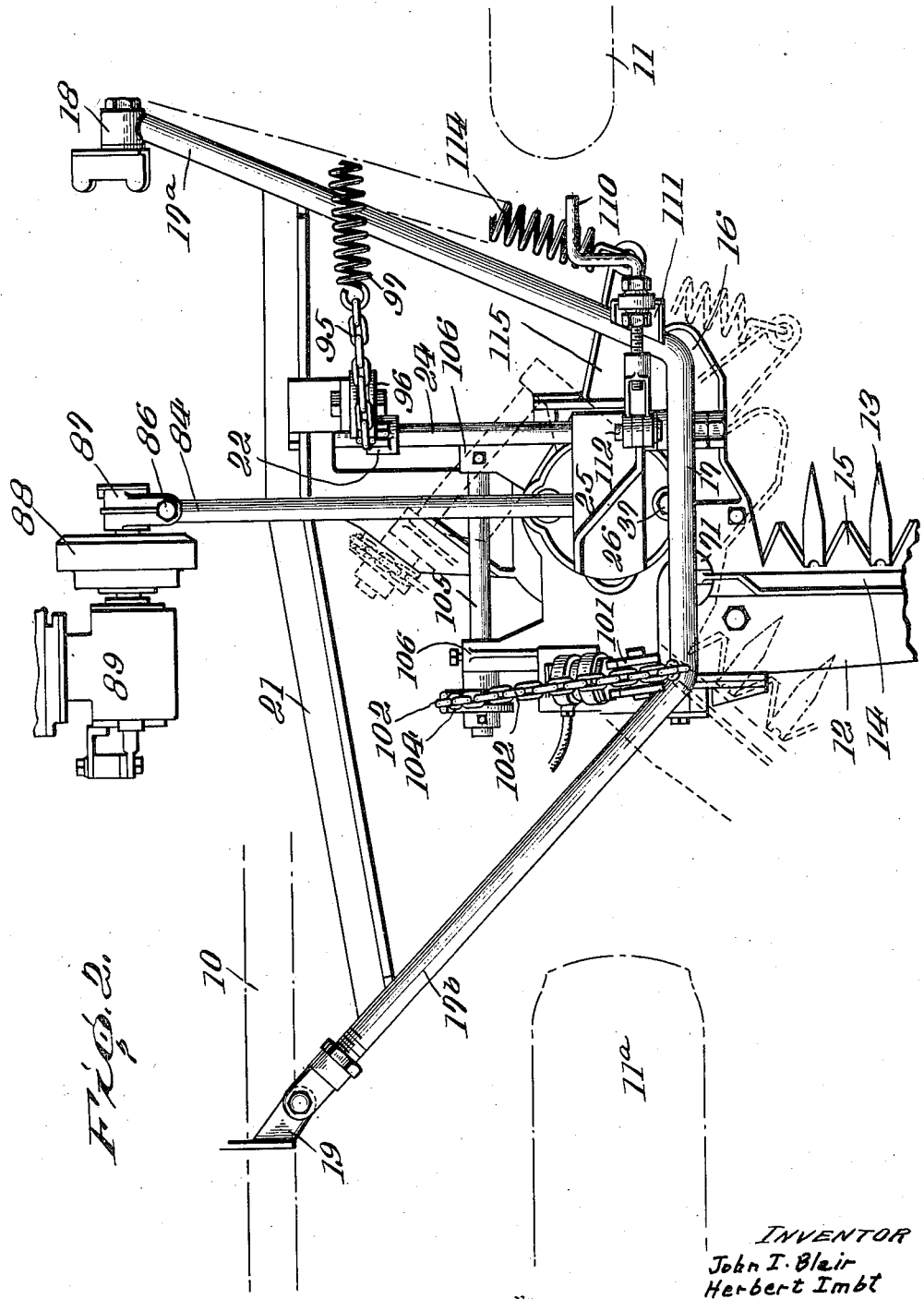

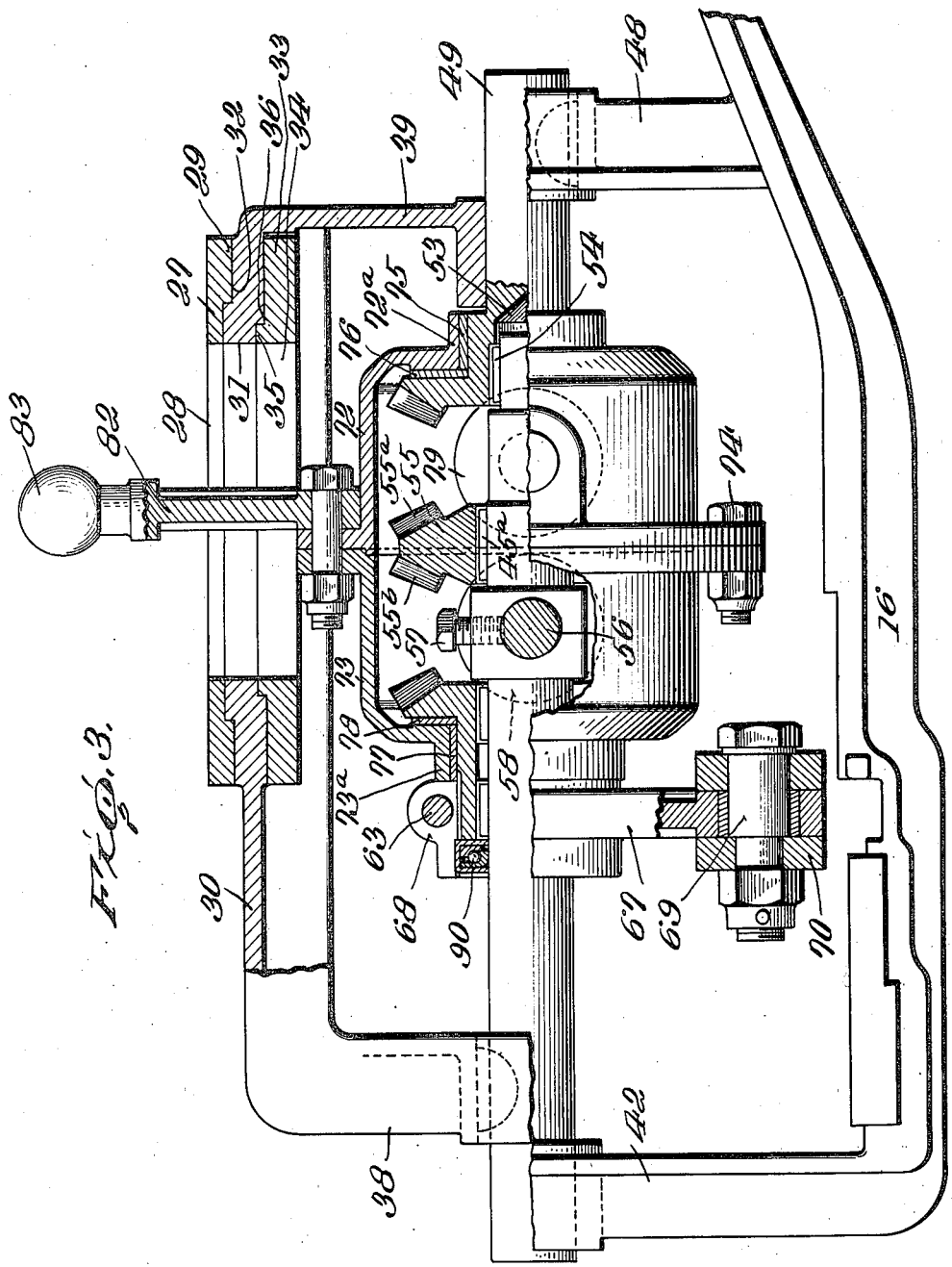

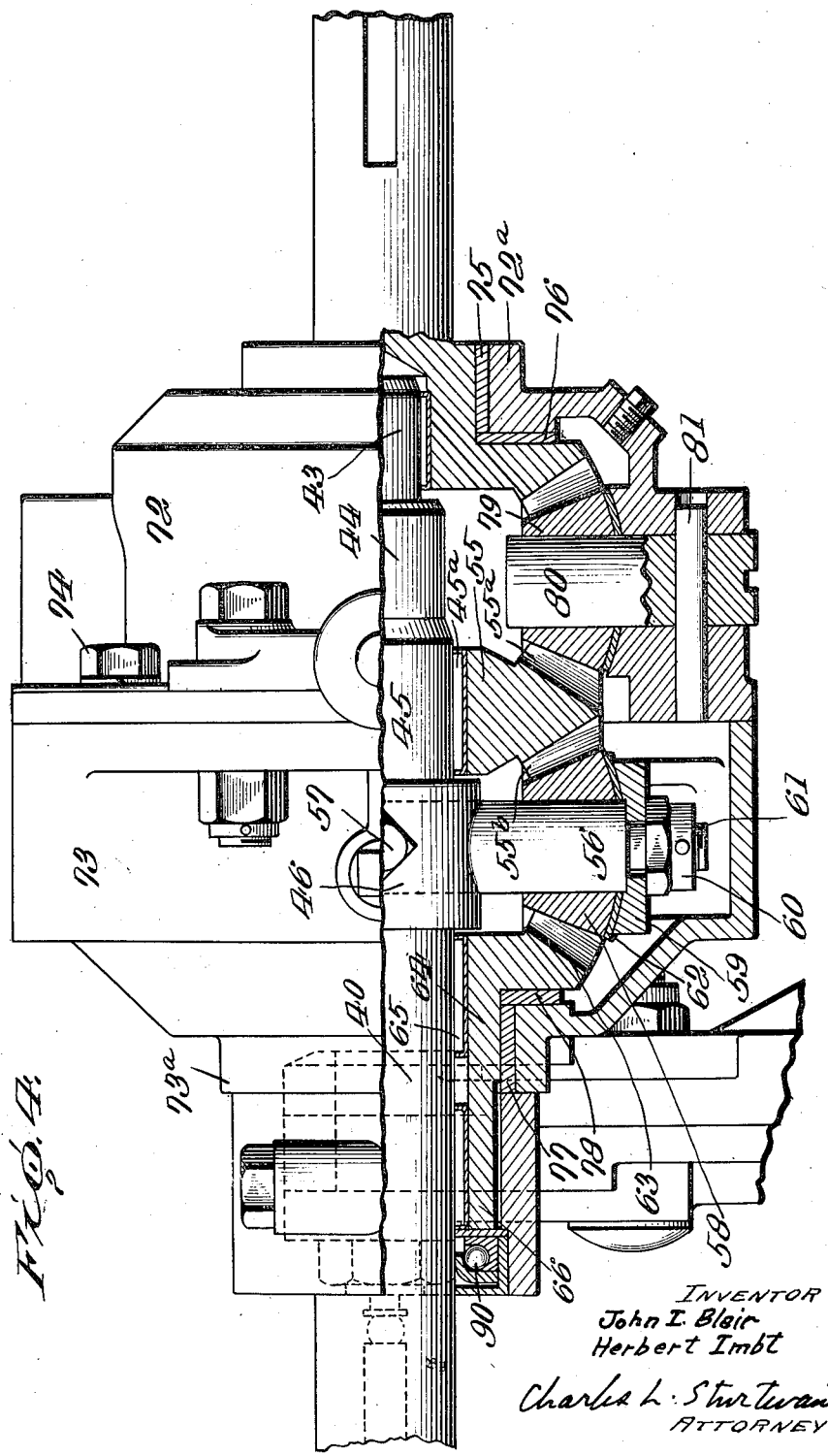

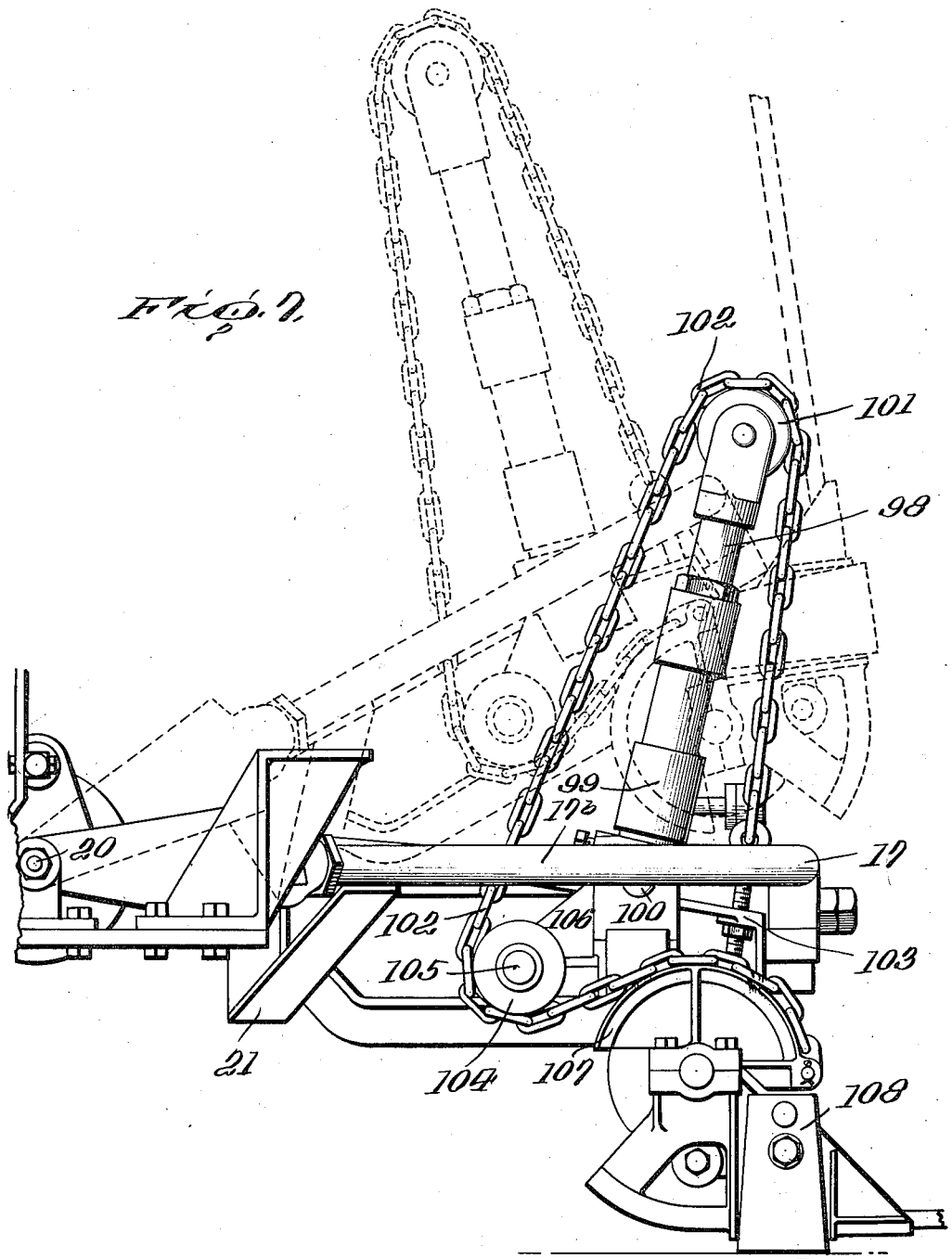

2,310,387

UNITED STATES PATENT OFFICE 2,310,387

MOWING MACHINE

John Insley Blair and Herbert Imbt, Stroudsburg, Pa., assignors to Worthington Mower Company, Stroudsburg, Pa., a corporation of Delaware Application June 22, 1940, Serial No. 341,954

13 Claims. (Cl. 56—25)

The present invention relates to new and useful improvements in a mowing apparatus, and more particularly to improvements in a mowing machine of the type which includes a vehicle having a sickle bar associated therewith.

A mowing machine of the above type generally includes some form of vehicle, preferably of the power operated tractor type, and a laterally extending sickle bar. The sickle bar includes a finger bar and a reciprocating knife bar which is preferably operated from the motive power of the vehicle through suitable power transmitting mechanism, although it is to be clearly understood that separate power means for the knife bar may be employed, if so desired. The sickle bar extends laterally from the vehicle and is connected to the vehicle in such a manner that it can assume various angular operating positions relative thereto. Thus, the mowing machine is one which is particularly adapted for cutting vegetation along inclined surfaces and as such can be readily employed as a highway mower for cutting vegetation along banks, ditches and other inclined surfaces.

An object of the present invention is to provide a mowing machine substantially of the above type which is extremely flexible so as to permit operation of the sickle bar in various angular positions with a minimum amount of manual attention.

A further object of the invention is to provide an improved mechanism for transmitting movement to the knife bar of the sickle bar from a suitable source of power in such a manner that the sickle bar can be operated in various angular positions without changing the predetermined stroke of the knife bar.

A further object of the invention is to provide a connection between the sickle bar and the vehicle, which connection is intimately associated with the driving or power transmitting mechanism and is constructed and arranged to permit operation of the sickle bar in various angular positions and to also permit a swing back of the sickle bar for safety purposes when striking obstructions.

A still further object of the invention is to provide a mowing machine of the above type wherein the power transmitting mechanism includes a lubricant-containing housing which forms an operating part of the power transmitting mechanism.

A still further object of the invention is to provide a mowing machine of the above type wherein the power transmitting mechanism includes differential intermeshing gears at least one of which is associated with the housing.

A still further object of the invention is to provide a mowing machine wherein the lubricant-containing housing is oscillated by a pitman rod and has associated therewith a pinion gear forming a part of the power transmitting mechanism.

The invention still further aims to provide a mowing machine of the above type wherein the sickle bar is adapted to pivot about the axis of the power transmitting mechanism for operation in various angular positions and also about a vertical axis substantially in line with the connection between the pitman rod and the power transmitting mechanism without appreciably affecting the driving connection.

The above and other objects of the invention will in part be obvious and will be hereinafter more fully pointed out.

In the accompanying drawings:

Fig. 1 is a perspective view, showing the sickle bar mounted on a vehicle.

Fig. 2 is an enlarged top plan view, showing the sickle bar mounted on a vehicle, the dotted lines indicating the swing back of the sickle bar for safety purposes.

Fig. 3 is an enlarged side view of the sickle bar shoe and the power transmitting mechanism, partly in section.

Fig. 4 is a further enlarged top view of the power transmitting mechanism, partly in section.

Fig. 5 is a detail side view of the sickle bar shoe and a part of the power transmitting mechanism, partly in section.

Fig. 6 is a detail side view, partly in section, showing the shoe support and the supporting shaft for the power transmitting mechanism.

Fig. 7 is an enlarged side elevation of the sickle bar assembly, showing, in full and dotted lines, the sickle bar and supporting structure in various positions for an adjusted height of cut and for angular cutting adjustments.

Referring more in detail to the accompanying drawings, and particularly to Figs. 1 and 2 at this time, the vehicle in the form of a tractor, is illustrated as including a frame 10 and front and rear wheels 11, 11a, respectively. The sickle bar is of a conventional type and includes a finger bar 12 having fingers 13 extending forwardly thereof and a reciprocable knife bar 14 having forwardly extending teeth 15 operating between the fingers on the finger bar. A supporting shoe 16 is connected to the inner end of the sickle bar. As shown for purposes of illustration, the sickle bar is disposed between the front and rear wheels 11, 11a and extends outwardly therefrom.

The sickle bar is primarily supported on the tractor frame by a tubular member 17 which extends substantially parallel to the tractor frame and which includes inwardly extending angular extensions 17a, 17b. The inner end of the forward extension 17a is pivotally connected, as generally indicated at 18, to the tractor frame, while the inner end of the extension 17b is connected to a bracket 19 which, in turn, is pivotally connected, as at 20, to the tractor frame. The supporting member 17 is thus supported on the tractor by substantially horizontal and longitudinal pivots so that the member 17 can be moved vertically with respect to the vehicle. The legs or extensions 17a, 17b of the member 17 are reinforced by an angle bracing member 21.

The brace member 21 is provided with an upstanding lug 22 and the tubular member 17 is provided with a depending lug 23, these lugs being provided with aligned apertures for supporting a bar or shaft 24 which extends transversely of the tractor. A bearing member 25 is journalled on the shaft 24 for tilting movement. This bearing member includes a cover portion 26 and a base portion 27 (Fig. 3) which has an aperture 28 therethrough and an annular depending shoulder 29.

A shoe supporting member in the form of a bracket 30 (Fig. 6) has a top surface which is provided with an aperture 31 (see Fig. 3) registering with the aperture 28 and with an annular depressed portion 32 into which fits the depending annular shoulder 29. A circular plate 33 (Fig. 3) is disposed beneath the bottom surface of the bracket 30 and is provided with an aperture 34 registering with the apertures 28, 31. The plate 33 is provided with an upstanding annular rib 35 which snugly fits within an annular recess 36 in the bracket 30. The base portion 27 of the bearing bracket 25 is secured to the plate 33 by bolts 37 (Figs. 1 and 2) which extend through slots (not shown) in the top of the bracket 30. Thus, the bearing bracket 25 and the plate 33 are fixed together and form a bearing between which the supporting bracket 30 can rotate relative thereto, as shown by the dotted line position of Fig. 2.

The supporting bracket 30 has depending spaced arms 38, 39 which are for the purpose of supporting the shoe 16 in a manner to be fully pointed out. The arm 38 is apertured to receive a supporting shaft 40 which is keyed, as at 41, thereto. One end 40a of the shaft 40 extends beyond the arm 38 and has rotatably mounted thereon an upstanding arm 42 at the rear end of the shoe 16. The opposite end of the shaft 40 terminates short of the arm 39 and is provided with stepped portions 43, 44, 45, and an enlarged portion 46 having an aperture 47 extending horizontally therethrough.

The forward end of the shoe 16 has an upstanding arm 48 fixed thereon. The arm 48 is apertured to receive one end of a stub shaft 49 which is keyed to the arm, as at 50. The inner end of the shaft 49 has a bevel gear 51 fixedly mounted thereon and provided with a hub portion 52. The hub portion is internally recessed within the bevel gear 51, as shown at 53 (Fig. 3). The recess 53 receives the smallest stepped portion 43 at the end of shaft 40 and roller bearings 54 are disposed between these shafts which are thus in axial alignment. The shaft 49 rotates with rotation of the shoe 16, as does the bevel gear 51, but the shaft 40 remains stationary.

A bevel gear 55 (Figs. 3 and 4) having opposite bevel faces 55a, 55b is mounted on the stepped portion 45 of the shaft 40 by anti-friction bearings 45a in the form of rollers for angular movement, that is, rotational movement about the axis of the shaft. A pin 56 extends through the aperture 47 in the enlarged portion 46 on the shaft 40 and protrudes from opposite sides thereof. This pin 56 is held in the aperture 47 by a screw 57 or the like so that the pin is fixed with respect to the shaft. Each protruding end of the fixed pin 56 carries a pinion gear 58 which is in mesh with the face 55b of the bevel gear 55. The pinion gears 58 are rotatable with respect to the axis of the pin 56, but are fixed against angular movement about the axis of the shaft 40. These pinion gears are maintained in position in any suitable manner, as, for instance, by a locking washer 59 which is held by a locking nut 60 engaging the threaded end 61 of the pin 56. An anti-friction bearing or bushing 62 may be placed between the washer 59 and the adjacent face of each pinion gear.

A bevel gear 63 surrounds the shaft 40 immediately adjacent the enlarged portion 46 and meshes with the pinion gears 58. This bevel gear has a hub portion 64 mounted on roller bearings 65 or the like around the shaft 40 and is thus permitted to rotate relative to the axis of shaft 40. The hub portion 64 merges into a sleeve portion 66 also mounted on roller bearings around the shaft 40, and this sleeve portion 66 has a radially extending arm 67 secured thereto by a suitable form of clamping device 68. The depending radial arm 67 is pivotally connected, as at 69, to a link 70 which, in turn, is pivotally connected to the knife bar 14, as at 71. The knife bar 14 is reciprocated through this connection in the manner to be hereinafter pointed out.

A housing surrounds the above-mentioned gears and is formed in two parts 72, 73, which are flanged and secured together by bolts 74 or the like. The housing or casing part 72 has the outer end thereof extended inwardly toward the stub shaft 49 and is provided with a collar portion 72a which surrounds the hub portion 52 of the bevel gear 51. A suitable form of bushing 75 is disposed between the hub portion and the collar to seal the connection and to provide a bearing. A substantially vertically arranged annular bushing 76 is disposed between the inner surface of the casing part 72 and the adjacent surface of the bevel gear 51. The outer end of the opposite casing part 73 is directed inwardly toward the shaft 49 and is provided with a collar 73a surrounding the hub portion 64 of the bevel gear 63 within the arm clamping means 68. A bushing 77 is disposed between the collar 73a and the hub portion 64, and a further bushing 78 is disposed between the inner surface of the casing part 73 and the adjacent surface of the bevel gear 63.

Referring further to Figs. 3 and 4, and particularly to Fig. 4, it will be seen that the casing part 72 has one or more pinion gears 79 carried thereby and extending inwardly therefrom. The pinion gear 79 is rotatably mounted on a fixed stub shaft 80 which is secured to the casing part 72 by a pin 81 or the like, and which extends inwardly of the casing. The pinion gears 79 (preferably mounted at opposite sides of the casing part 72) are in mesh with the bevel gear 51 and also with the face 55a of the bevel gear 55. The casing has an arm 82 secured thereto, and this arm extends outwardly through the opening 31 in the bracket member 30 and also through plate 33 and the base 27 of the bearing bracket 25, as particularly shown in Fig. 4. The free end of the arm 82 is ball-shaped, as at 83, and this ball-shaped end 83 is connected to a pitman rod 84 to form a ball and socket joint 85. The pitman rod 84 is connected to the arm 83 below the cover 26 of the bearing bracket 25 and the opposite end of the pitman rod is pivotally connected, as at 86, to a pitman bearing 87 which, in turn, is connected to a crank disk 88 which is preferably of the clutch type shown in our copending application, Serial No. 294,956. The crank disk is rotated by means of a conventional power take-off 89. In place of the clutch disk, a flexible pitman may be employed in order to take up excessive strains encountered by the reciprocating knife bar 14 and thus prevent damage to the operating mechanism, as in the case of the clutch type disk. The casing may be supplied with some form of lubricating grease or oil for the gears which are inclosed therein. An oil seal bearing 90 is secured around the shaft 40 at the end of the sleeve portion 66 for preventing the escape of oil therebetween. Only a small amount of oil need be placed in the casing which is provided with a suitably sealed opening for this purpose, and lubricant may be supplied to the gears by movement thereof and also by the "splash" system.

When the sickle bar is in the substantially horizontal position shown in Figs. 1 and 3, operation of the knife bar 14 may be effected in the following manner. The power take-off is connected in known manner to the tractor power means and operation therof will effect rotation of the clutch crank disk 88 which, in turn, will cause reciprocation of the pitman rod 84. Reciprocation of the pitman rod will cause, through the arm 82, oscillation of the casing about and relative to the shafts 40 and 49. This movement of the casing will effect corresponding movement of the stub shafts or pins 80 and the pinion gears 79 which are carried thereby. As indicated above, the shaft 49 is fixed with the shoe 16 so that this shaft moves with the shoe and cannot move independently thereof. Therefore, in any predetermined position of the shoe, the shaft 49 and the bevel gear 51 are similarly fixed so that the bevel gear 51 normally acts as a rack which is stationary in any set position of the shoe. The pinion gears 79 mesh with the bevel rack 51 and also with the teeth 55a or the bevel gear 55. Thus, rotation of the pinion gears 79 and oscillation thereof with the housing will cause oscillation of the bevel gear 55 relative to the shaft 40. The pinion gears 79 may thus be considered planetary gears, in that they are bodily movable about the axis of the shaft 40, in addition to being rotatable or oscillatable about the stub shafts 80. These pinion gears 79 have movable axes, in that the pivot shafts 80 are movable with the casing.

The teeth 55b on the bevel gear 55 are in mesh with the pinion gears 58 so that oscillation of the bevel gear 55 will effect oscillation or rotation of these pinion gears which have fixed axes, in that they are mounted on a cross pin or shaft 56 rigidly fixed to the stationary shaft 40. Movement of the pinion gears 58 about the fixed shaft 56 will effect oscillation of the bevel gear 63 about the axis of the shaft 40 by reason of the intermeshing relationship. Oscillation of the bevel gear 63 and the hub and sleeve portions thereon will effect swinging movement of the depending arm 67 through the clamping device 68. Swinging or oscillating movement of the arm 67 about the shaft 40 will be transmitted to the knife bar 14 through the pivotal connection 69 with the link 70. Thus, the swinging movement of the arm 67 will transmit the desired reciprocatory movement to the knife bar in order to effect the cutting of vegetation.

For purposes of illustration, although not forming an essential part of the present invention, suitable means for adjusting and shifting the sickle bar have been shown (Figs. 1, 2 and 7). In order to adjust the cutting height of the sickle bar, a hand lever 93 is pivotally mounted on the tractor frame (Fig. 1) and the shorter lever arm thereof is connected to the bracing member 21 by a chain 94 or the like. In order to counterbalance the normal tendency of the sickle bar assembly to drop downwardly with the supporting member 17, a chain 95, cable or the like, is connected thereto and passes over a pulley 96 mounted on the tractor frame. A spring 97 or the like is employed for loading the chain 95 and counterbalancing the weight of the sickle bar assembly. Manipulation of the lever 93 will raise or lower the frame structure 17, 21, about pivots 20, 18 and the supported sickle bar assembly so that the cutting height of the shoe 16 and the sickle bar above the ground can be adjusted (Fig. 7).

In order to adjust the cutting angle of the sickle bar for the purpose of cutting vegetation along inclined surfaces, a hydraulic mechanism is generally indicated (Figs. 1, 2 and 7). A hydraulic piston or ram 98 is movable within a cylinder 99 which is pivotally mounted on the bracket 30 within a socket, as at 100. The ram 98 has a pulley 101 mounted at the exposed end thereof and a chain 102 or the like passes over this pulley. One end of the chain is connected, as at 103, to the bracket member 30, and the chain then passes over the pulley 101 and an idler pulley 104 which is carried by a shaft 105, this shaft 105 being carried by arms 106 extending inwardly from the supporting bracket 30 toward the tractor frame. The opposite end of the chain 102 passes from beneath the pulley 104 over the top of a grooved segment member 107 to which it is secured. The segment member 107 is loosely mounted on the end 40a of shaft 40 and is rigidly connected to the shoe 16 by a bracket plate 108. Since one end of the chain 102 is secured to the supporting bracket 30, upward movement of the ram 98 will cause rotation of the segment 107 and the plate 108 which will thus rotate the shoe and sickle bar assembly upwardly about the shaft 40. In this manner the cutting angle of the sickle bar can be adjusted. The ram may be operated from any suitable source of fluid pressure (not shown) through a flexible hose connection 109.

In order to change the inclination of the sickle bar, a crank 110 threadedly passes through a bracket 111 on the tubular extension 17a and is pivotally connected to the bearing bracket 25, as at 112. Rotation of the crank 110 will alter the inclination of the sickle bar by shifting the various brackets which are carried by the frame structure 17, 21 about the axis of shaft 24. A swing back of the supporting bracket 30 and the sickle bar assembly, as shown by dotted lines in Fig. 2, is also permitted by reason of the pivotal connection between the bracket 30 and the bearing bracket 25 (hereinbefore described) and the ball and socket connection of the pitman rod and arm 82. This swing back or safety release occurs when the sickle bar strikes an obstruction and operates against the action of a spring 114 which is connected to the tractor frame and to a lateral arm 115 on the supporting bracket 30.

It is to be clearly understood that any suitable means may be employed for effecting the various adjustments of the sickle bar, as mentioned above. For instance, hand levers may be employed for effecting adjustment of the cutting angle as well as the height of cut. The manner of effecting these various adjustments has been shown and briefly described merely for purposes of illustration.

The stroke of the reciprocating knife bar is preferably about three inches and the lengths of the arms 82, 67 are chosen for this purpose and suitable gear ratios in the transmitting mechanism may be employed. The stroke of the knife bar will remain the same in any angularly set position thereof by reason of the driving connection and mounting thereof. In so far as the driving gears within the housing are concerned, the sickle bar may be operated in any angular position with respect to shaft 40. However, there are practical limits to the permissive angular movement of the sickle bar because of the various supporting frame structures. The mowing machine is designed so that the permissive cutting angle of the sickle bar is approximately 180° from a position wherein the sickle bar extends substantially vertically in an upward direction to a position wherein the sickle bar extends substantially vertically in a downward direction.

When the shoe 16 and sickle bar assembly are rotated about shaft 40 as the pivotal axis, the stub shaft 49 and the bevel gear 51 will be rotated therewith and, when the pitman rod is stationary, the pinion gears 79 will be rotated about the stub shafts 80 without movement of the housing or these stub shafts. Similarly, the bevel gear 55 and the pinion gears 58 will be rotated. The depending arm 67, being connected with the shoe 16, will be moved with the bevel gear 63 through the gear train in order to compensate for movement of the bevel gear 51 at the opposite end of the housing. The end gears 63, 51 have opposite bevel faces so that movement of the intermediate gears is merely idle and compensatory, thus acting as a differential gear mechanism. The sickle bar may be moved about the shaft 40 even when the pitman rod is in operation because the intermediate gears on the shaft 40 act as a differential between the oppositely faced end gears 51 and 63 which move in unison with movement of the shoe. The differential gear train, in normal power transmitting operation, causes each outward stroke of the pitman rod 84 to effect a corresponding outward stroke of the depending arm 67 and the knife bar 14, and vice versa.

From the foregoing description, it will be seen that the supporting shaft for the gear mechanism is a two-part or split shaft consisting of shafts 40 and 49. The shaft 49 is fixed to the shoe and the shaft 40 is fixed to the bracket 30. Both shafts are normally stationary, although shaft 49 can rotate with the shoe 16 and both shafts can rotate with the bracket 30 during swing back of the sickle bar which, as indicated above, is accomplished against the action of the spring 114 which normally maintains the sickle bar assembly in proper cutting position. The ball and socket joint between the housing arm 82 and the pitman rod 84, in addition to the pivotal connection 87 at the opposite end of the pitman rod, permit this swing back of the sickle bar when striking an obstruction. A flexible pitman may be employed and such a pitman rod will bend during this swing back. The movable housing oscillates with reciprocation of the pitman rod and thus moves relative to shafts 40 and 49. Oil seal bearings are provided, as previously described, for preventing escape of oil from within the housing. The openings through the supporting bracket 30 and the bearing bracket 25 permit movement of the arm 82 connecting the housing with the pitman rod. It will be seen that the driving member may be rotated (power take-off or crank disk 88), reciprocated (pitman rod 84), or oscillated (housing), and these various movements are transformed into the desired reciprocatory movement of the knife bar through the gearing mechanism and the oscillating arm 67.

While one form of the invention has been shown for purposes of illustration, it is to be clearly understood that various changes in the details of construction and arrangement of parts may be made without departing from the scope of the invention, particularly as set forth in the appended claims.

Having thus described the invention, what is claimed is:

1. A mowing machine comprising a vehicle, a frame structure carried by said vehicle, a supporting shaft carried by said frame structure and fixed against rotation relative thereto, a plurality of intermeshing gears carried by said supporting shaft, a shoe rotatably mounted on said supporting shaft and having a bevel gear fixed thereto and rotatable with said shoe in relation to said frame structure, a sickle bar carried by said shoe and operable by said gears, a housing oscillatable with respect to said supporting shaft and said bevel gear and inclosing the said gears to prevent damage thereto, a pinion gear carried by said housing in mesh with said bevel gear and one of said intermeshing gears, and means for oscillating said housing whereby to effect operation of the sickle bar through said intermeshing gears.

2. A sickle bar mowing machine comprising a vehicle, a frame structure connected to said vehicle, a bearing bracket for suporting the sickle bar and carried by said frame structure for tilting movement about an axis extending transversely of said vehicle whereby to adjust the inclination of the sickle bar, a supporting bracket having depending arms, said bearing bracket and said supporting bracket having registering apertures therethrough and being connected to permit horizontal pivotal movement of said supporting bracket whereby to permit safety swing back of the sickle bar, a shoe at the inner end of the sickle bar, means connecting said shoe to said depending arms for permitting pivotal movement of said shoe substantially longitudinally of the vehicle to permit adjustment of the cutting angle, and means including an arm extending through said registering apertures for operating the sickle bar.

3. A mowing machine comprising a vehicle, a frame structure connected to the vehicle for movement therewith, means providing aligned shaft elements extending longitudinally of the vehicle, one of said elements being stationary and fixed to said frame structure and the other of said elements being rotatable relative to the frame structure, a sickle bar, a shoe carrying the sickle bar and having one end thereof rotatably mounted on the fixed shaft element and having the opposite end thereof fixed to the rotatable shaft element whereby the shoe and sickle bar can pivot about the axis of the aligned shaft elements to vary the cutting angle, and means including differential gearing for operating the sickle bar and said gearing including intermeshing gears on the fixed shaft element and a gear fixed to the movable shaft element for maintaining a constant stroke of the sickle bar in all angular adjustments of the cutting angle.

4. A mowing machine comprising a frame structure connected to the vehicle and including a bracket member capable of horizontal pivotal movement, shaft means carried by said bracket member and normally extending longitudinally of the vehicle, a sickle bar carried by said bracket member and adapted to pivot about the axis of said shaft means for changing the cutting angle and to also pivot horizontally with the bracket member to provide a safety release, means providing a relatively large-diameter opening in the bracket member, and means for operating the sickle bar and including an arm oscillatable about the axis of the shaft means and extending through said opening which provides space for free oscillation of the said arm.

5. A mowing machine comprising a vehicle, a frame structure connected to said vehicle, a bracket member mounted for pivotal movement on said frame structure, a non-rotating supporting shaft carried by said bracket member, a shoe having an upstanding arm rotatably mounted on said supporting shaft and carrying a fixed shaft at the opposite end thereof, said fixed shaft being rotatably journaled in said bracket member for permitting the shoe to be angularly rotated about the axis of said supporting shaft, a sickle bar carried by said shoe, and gear means including a cooperating rack on said fixed shaft for operating said sickle bar in various angular positions.

6. A mowing machine comprising a vehicle, a frame structure connected to said vehicle, means providing axially aligned shaft elements carried by said frame structure, one of said elements being stationary and the other of said elements being rotatable relative to said frame structure, a shoe having one end thereof rotatably mounted on the fixed shaft element and having the opposite end thereof fixed to the rotatable shaft element whereby the shoe can pivot about the axis of the aligned shaft elements by rotating said rotatable shaft element, a sickle bar carried by said shoe, and means including a bevel gear on said rotatable shaft element for operating said sickle bar in various angular positions.

7. A mowing machine comprising a vehicle, a frame structure connected to said vehicle, means providing a two-part shaft associated with said frame structure, one part of said shaft being fixed with respect to said frame structure and the other part of said shaft being rotatable relative to the frame structure, a shoe rotatably mounted on the fixed part of said shaft and fixed to the rotatable part of said shaft whereby to permit angular movement of the shoe about the axis of said shaft, a sickle bar carried by said shoe, and intermeshing gear means on said shaft for operating said sickle bar and a bevel rack carried by the rotatable part of said shaft for permitting continued operation of the sickle bar in various angular positions.

8. A mowing machine comprising a vehicle, a frame structure connected to said vehicle, a supporting shaft fixed against rotation relative to said frame structure, a plurality of intermeshing gears carried by said shaft, a stub shaft rotatable with respect to said frame structure and carrying a bevel gear, a shoe rotatably mounted on said supporting shaft and fixed to said stub shaft whereby to permit angular movement of the shoe about the axes of said shafts, a sickle bar carried by said shoe, and means including a pinion gear meshing with one of said intermeshing gears and with said bevel gear for providing a differential gear system to effect operation of said sickle bar through various angular positions.

9. A mowing machine comprising a vehicle, a cutting device connected to the vehicle for movement therewith, and means including a movable housing and gearing inclosed therein and actuated by movement of the housing for effecting operation of the cutting device.

10. A mowing machine comprising a vehicle, a sickle bar connected to the vehicle for movement therewith, intermeshing gears operatively associated with the sickle bar, a housing for the gears with at least one of said gears carried by said housing, and means connected to the housing for actuating the said housing and the gear carried thereby in order to effect operation of the sickle bar through the said gears.

11. A mowing machine comprising a vehicle, a sickle bar connected to the vehicle for movement therewith, a supporting shaft carrying a movable housing, a pitman rod connected to the housing for oscillating the said housing about the axis of said shaft, and means including differential gearing inclosed within said housing and operable upon oscillation of said housing for effecting reciprocation of the sickle bar in various angular positions.

12. A mowing machine comprising a vehicle, a cutter mechanism connected to the vehicle for movement therewith and for limited rearward pivotal movement relative thereto, gearing operatively associated with the cutter mechanism, a housing inclosing the gearing and operatively associated therewith, and means for actuating the housing in order to effect operation of the cutter mechanism through the gearing.

13. A mowing machine comprising a vehicle, a cutter mechanism connected to the vehicle for movement therewith and for limited rearward movement relative thereto to provide a safety release, gearing connected to said cutter mechanism, a housing inclosing the gearing and operatively associated therewith, said housing and the inclosed gearing being movable with the cutter mechanism during safety release, and a pitman rod pivotally connected to the housing for actuating the said housing and the gearing to effect operation of the cutter mechanism and the pivotal connection permitting safety release movement of the housing substantially independently of the pitman rod.

JOHN I. BLAIR.
HERBERT IMBT.